Feb. 21, 1939. G. A. LYON 2,147,661
METHOD OF MAKING ORNAMENTAL DISK STRUCTURES
Original Filed April 9, 1936 2 Sheets-Sheet 1
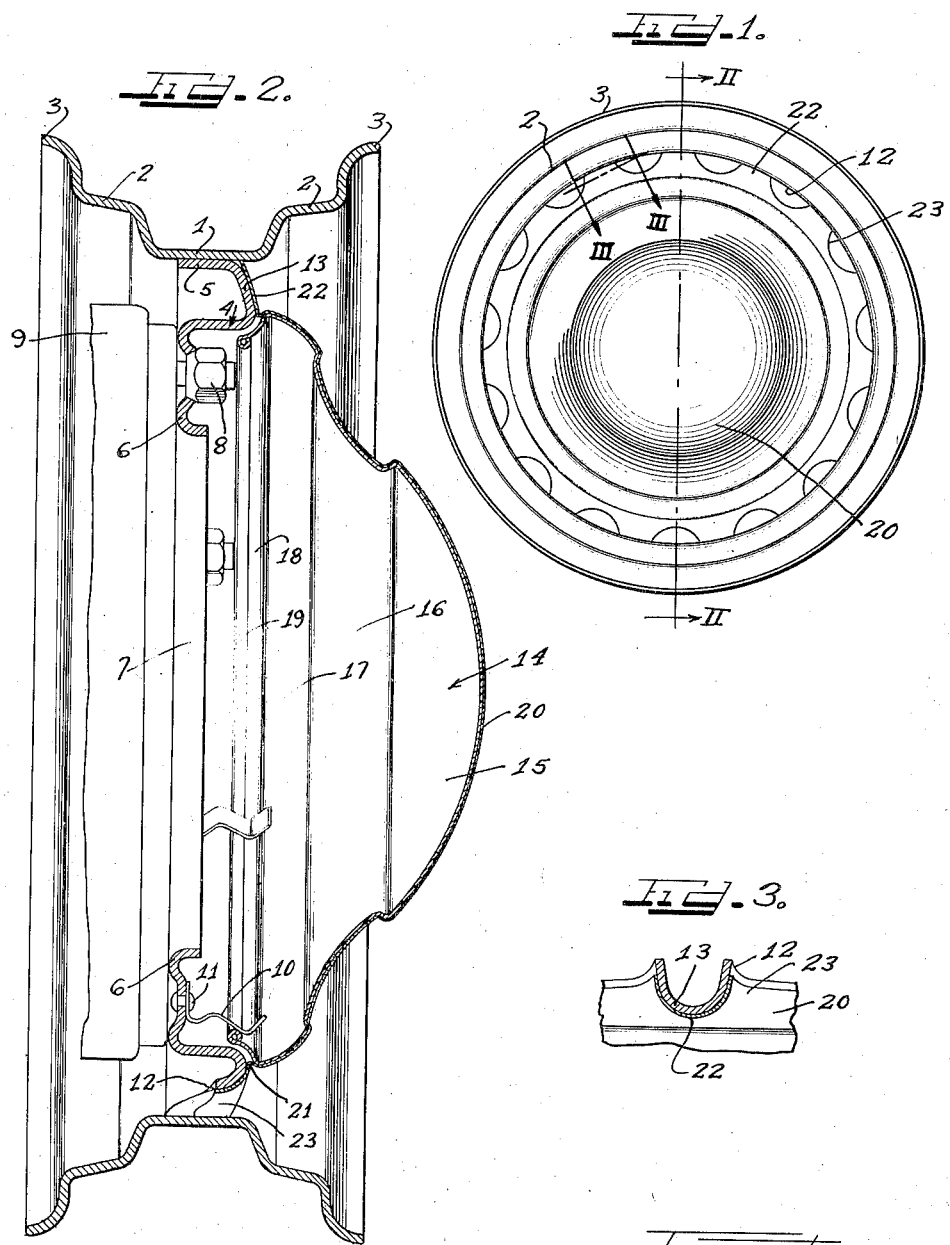
Inventor
GEORGE ALBERT LYON.

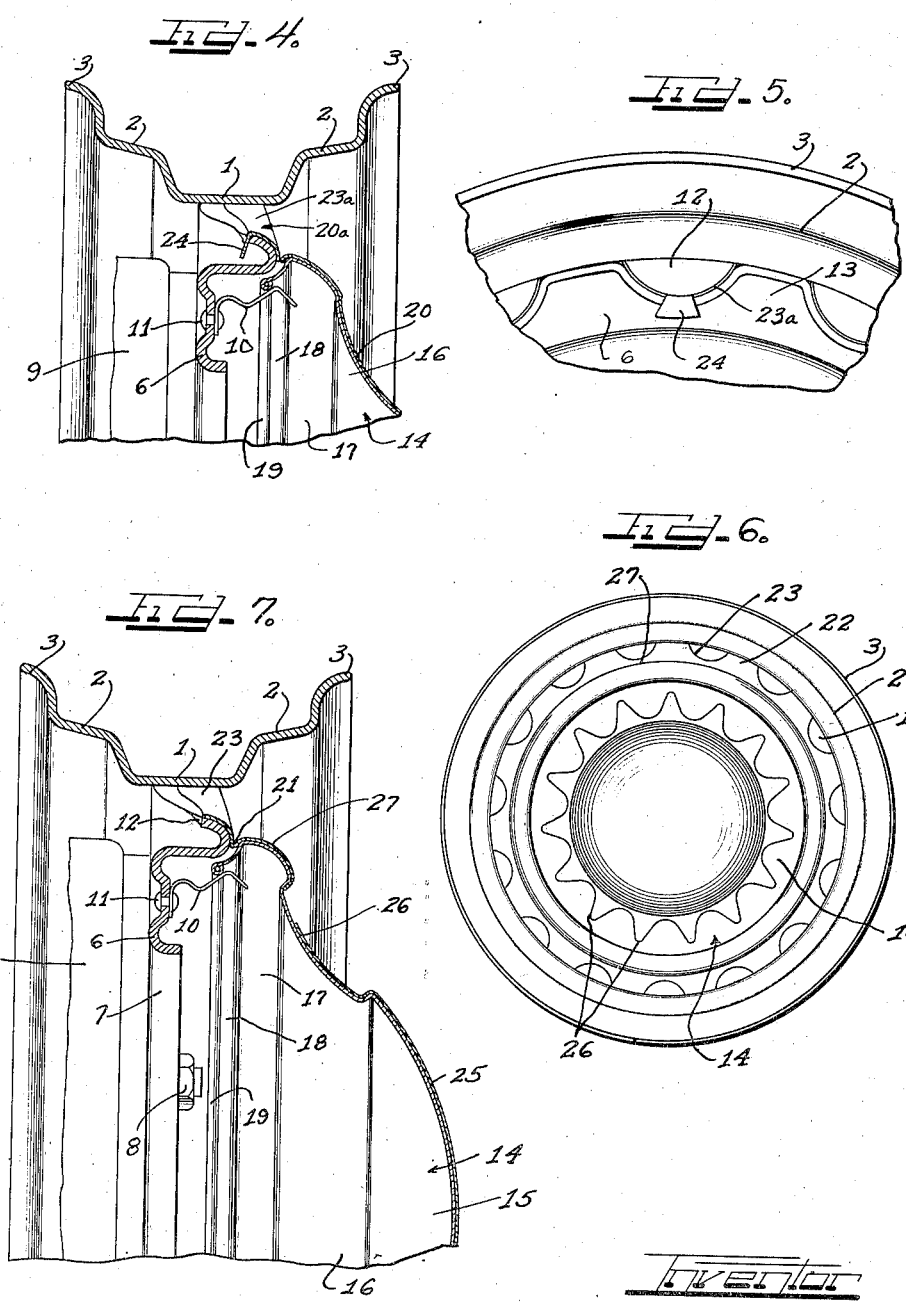

UNITED STATES PATENT OFFICE 2,147,661

METHOD OF MAKING ORNAMENTAL DISK STRUCTURES

George Albert Lyon, Allenhurst, N. J.

Original application April 9, 1936, Serial No. 73,399. Divided and this application November 5, 1936, Serial No. 109,248

1 Claim. (Cl. 29—159)

This invention relates to improvements in an ornamental disk structure for disposition over the side surfaces of vehicle wheels for the purpose of enhancing the appearance not only of the wheels but also of the vehicle as a whole, although the invention will have other uses and purposes as will be apparent to one skilled in the art.

This application is a division of my copending application entitled "Ornamental disk structure", filed April 9, 1936, Serial No. 73,399.

In the art of manufacturing ornamental disk structures for decorating the side surfaces of vehicle wheels, it is highly desirable, if not essential, to provide a structure which not only enhances the appearance of the wheel and gives the wheel an appearance in harmony with the body of the vehicle, but also which is very economical to manufacture and which may be easily applied to and removed from the wheel in the event the ornamental structure overlies the wheel attaching bolts. In providing the ornamental structure with an external finish, it has been found to be much more economical to finish a relatively thin piece of metallic sheet material than to endeavor to apply a satisfactory finish on a heavier piece of metal. It has further been found more economical, in the event a two-tone or multi-color finish is desired, to apply different colors or finishes to two separate pieces of metal, than to endeavor to apply a plurality of colors or finishes to the same piece of metal.

In certain instances, vehicle wheels have been provided which have a relatively large central opening therein and a narrow portion of the body part of the wheel between the fastening bolts circle and the base flange of the wheel rim. In the event the body portion of the wheel is formed in simulation of spokes, difficulty has been experienced in properly covering the side surface of a wheel with an ornamental disk structure and still retaining the spoked effect. Another important item in manufacturing ornamental disk structures resides in the saving of as much material as possible to thereby keep down the expense of production.

With the foregoing in mind, it is an object of the present invention to provide an ornamental disk structure for a vehicle wheel, which disk structure comprises a central supporting portion capped by a relatively thin sheet metal covering which extends beyond the central portion and overlies a part of the wheel not covered by said central portion.

Another object of this invention is the provision of a hub cap for a vehicle wheel, which hub cap is covered by a sheet of relatively thin metal, decorated in a desirable fashion, and which sheet extends radially outwardly beyond the hub cap to overlie a part of the vehicle wheel not covered by the hub cap.

Still a further object of this invention is the provision of an ornamental wheel disk structure including a central supporting portion of the general configuration of a hub cap covered by a relatively thin piece of sheet metal which not only overlies the central supporting portion but extends therebeyond, and the extending portion is shaped to intimately overlie the body part of a wheel constructed in simulation of a spoked wheel.

A further feature of the invention resides in the provision of a two-part ornamental covering for a wheel consisting of a hub cap structure and an annular disk portion surrounding the hub cap structure, the hub cap part including a supporting body covered by a decorative sheet, and the annular disk portion being initially a part of said decorative sheet and severed therefrom during or after the forming of the parts.

Still another feature of the invention is the provision of an ornamental disk structure comprising an ornamental disk of relatively thin sheet material shaped for substantially permanent attachment over a hub cap supporting structure and extending beyond the hub cap structure to overlie an outer portion of a vehicle wheel, the disk being cut or severed adjacent the outer edge of the hub cap portion, and separate means being provided to hold the outer annular part of the disk upon the wheel.

Still another object of the invention is the provision of an enlarged hub cap for a wheel carrying decorative means thereupon which extend outwardly beyond the hub cap to overlie another portion of the wheel.

Still another object of the present invention is the provision of a new and novel method of making an ornamental disk structure for overlying the side surface of a vehicle wheel.

Other objects, features and advantages of this invention will more fully appear from the following description, taken in connection with the accompanying drawings which illustrate several embodiments of the invention, and in which:

Figure 1 is a side elevational view of a vehicle wheel, without the tire, showing the same equipped with an ornamental disk structure embodying improvements of the present invention;

Figure 2 is an enlarged fragmentary vertical sectional view, with parts in elevation, of the structure shown in Figure 1, taken substantially as indicated by the line II—II of Figure 1, looking in the direction of the arrows;

Figure 3 is an enlarged fragmentary plan sectional view taken substantially as indicated by the line III—III of Figure 1, looking in the direction of the arrows;

Figure 4 is a fragmentary vertical sectional view, with parts in elevation, of a similar vehicle wheel equipped with a slightly modified form of ornamental wheel disk structure;

Figure 5 is a fragmentary rear elevational view of the structure shown in Figure 4;

Figure 6 is a side elevational view of the same wheel equipped with a still different form of ornamental disk structure; and Figure 7 is a fragmentary vertical sectional view, with parts in elevation, of the structure seen in Figure 6.

As shown on the drawings:

While the present invention may be made in various forms without departing from the spirit and principle of the invention, and while it may be associated with vehicle wheels of many and various types, for the purpose of clarity it is shown herein as associated with a vehicle wheel of the disk type having a relatively narrow body part.

The wheel includes the usual form of drop-center tire rim comprising a base flange 1, intermediate flanges 2—2, and side edges 3—3, all integrally connected. The wheel also includes a body part generally indicated by numeral 4 having an inwardly turned flange 5 connected to the base flange of the rim in any suitable manner, such as by riveting or welding. The body part 4 also includes a fastening flange 6 extending radially inwardly having a turned inner margin 7 defining a relatively large hub opening. The fastening flange 6 is suitably apertured at spaced intervals to accommodate fastening means, such as the bolts 8, by means of which the wheel may be attached to a vehicle part, such as the brake drum 9, or to a spare wheel carrier, as the case may be. A plurality of resilient retaining elements 10 are attached in spaced relationship by means of rivets 11 or in any other suitable manner to the fastening flange 6, these elements being designed to hold a hub cap in position over the central opening and provide means for a snap-on engagement of the hub cap.

Between the bolt circle of the bolts 8 and the aforesaid flange 5, the body part 4 is shaped in simulation of a spoked wheel, including spaced apertures 12 in simulation of the spaces between spokes and spoke formations 13 between the apertures. Of course, the body part is shaped or indented inwardly around each aperture so that the spoke portions 13 will be somewhat outstanding. In the particular wheel illustrated, the body part of the wheel is relatively narrow, so that the spoke formations are relatively short.

The ornamental disk structure to cover the outer side surface of the wheel, in this instance, includes a hub cap member generally indicated by numeral 14, of such a size as to completely overlie the central opening in the wheel. This hub cap structure has a central dome portion 15, a depressed annular part 16 therearound, and another annular part 17 which terminates integrally in an inwardly turned flange 18 having a rolled edge 19 for engagement with the resilient retaining members 10 on the body part of the wheel. The hub cap body structure proper is of sufficiently strong or thick stock to stand repeated usage in being put on and removed from the wheel.

Overlying the hub cap body 14 is a relatively thin covering which is intimately associated with the body 14, and spun or rolled into the depressed portion 16 so that the covering is substantially an integral part of the hub cap structure. The jointure between the depressed portion 16 and the dome part 15 is substantially an undercut, so that the covering 20 is held firmly in position upon the hub cap body. The covering 20 is also rolled around the outer periphery of the annular part 17 so that it preferably curls somewhat around this edge, as indicated at 21. From the inward roll 21, the covering is substantially reversely bent so that it extends outwardly to the rim of the wheel, thereby providing an apron overlying the spoke simulating part of the wheel body. This portion of the combined hub cap structure only comprises the covering 20, and this apron is shaped so as to intimately overlie the spoked part of the wheel.

With reference to Figure 2, it will be seen that the apron of the hub cap structure is provided with raised portions 22 to intimately overlie the spokes 13, and also with recessed and apertured portions 23 to fit intimately into the apertured parts 12 between the spokes. As seen best in Figure 3, there is an intimate fit over the spoke portions by the hub cap apron.

In attaching the wheel disk structure to the vehicle wheel, it is simply necessary to press the structure axially upon the wheel, the resilient retaining means 10 snapping into engagement over the rolled edge 19 of the hub cap body. The entire disk structure may be easily removed from the wheel with the use of a contractible tool of the nature of that set forth in my copending application for patent entitled "Ornamental beaded wheel disk", filed December 13, 1935, Serial No. 54,161. In general, this tool comprises a contractible and expansible split ring having a pair of free ends extending at an angle to the ring proper to form a convenient handle. The ring portion of the tool is adapted to snap into one of the grooved indentations of the ornamental member, the latter then being pried off by the application of a leverage force to the free ends of the tool.

In Figures 4 and 5, I have shown a slightly modified form of construction, wherein the same previously described structure has been shown, with the exception that in the annular groove 21, the covering 20 has been severed to provide an apron 20a separate from the central part of the disk structure. The apron 20a, of course, was initially the same piece as the covering 20, and this separation might be effected after each of these parts has been completely formed.

In this instance, added means are required to retain the apron in position upon the wheel, when the central or hub cap part is removed from the wheel. To this end, when the formations 23a are provided in the apron, and a piece of metal punched out to provide the aperture, a tab 24 is left. This tab may be either mechanically or manually bent over the edge portion of the part 12 in the wheel body, as seen in Figures 4 and 5. As many as may be deemed desirable of these tabs may be provided on the apron. It will be noted that the tabs are dovetail in shape so as to define a line of bend and provide a structure constantly urging the apron in tight cooperation with the wheel body.

In Figures 6 and 7 I have shown a still different form of ornamental disk structure associated with the same wheel hereinabove described. In this instance, also, the disk structure includes the hub cap body 14 of the same character as above described and held on the wheel in the same manner. This hub cap body 14, however, carries both a central covering and an outwardly extending apron for overlying the spoked portion of the wheel, but the apron is separate from the central covering, there being a space therebetween through which the hub cap body is visible.

The central portion of the hub cap body is provided with a covering 25 interlocked over the undercut jointure between the parts 15 and 16 of the cap body, and projecting therebeyond over the outer face of the part 16 is a series of scalloped points to give the appearance of a multi-pointed star. Between the scallops or points, the hub cap body portion 16 is visible. It is customary in the manufacture of such parts to cover them with some external finish or color to prevent oxidation of the metal. Usually, this finish is in keeping with the color scheme used on the body of the vehicle. The relatively thin covering 25 may be chrome-finished, highly embossed, enameled or lacquered, to present a contrasting two-tone effect on the wheel. This is provided very economically in the present instance, because it is much more economical to provide two separate pieces, each with a different finish, than to endeavor to apply two different finishes to the same piece.

In this instance, an apron 27 is also provided which is spun or rolled around the annular projecting portion 17 of the hub cap body, this apron extending outwardly to cover the spoked portion of the wheel in the manner previously described herein. It will be noted that the apron is carried by the hub cap body, as is the covering 25, so that the entire disk structure may be handled as a one-piece unit. The application of the disk structure to the wheel and removal therefrom is the same as previously described.

From the foregoing, it will be apparent that I have not only provided a novel disk structure for ornamenting the outer side surface of a vehicle wheel, but also a novel method of making such a structure. The invention lends itself to economy in manufacture and durability in use.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

The process of manufacturing an ornamental member for disposition on the outer face of a vehicle wheel of the type having an inner hub cap and an outer ornamental shell formed with a central crown portion coextensive with the hub cap and an outer peripheral portion extending beyond the inner hub cap in the form of an apron, said shell being of such construction as to require that a hub cap be mounted therein to enable use of the shell of the wheel, which includes depressing a thin sheet of metallic stock to form a convexly curved crown portion and an outer peripheral apron portion therein, nesting said crown portion over a hub cap of the desired configuration, pressing them into intimate relation so that said crown portion is backed up and reinforced by said hub cap, and depressing the outer metallic shell, at the line of junction of the peripheral and crown portions inwardly in an oblique direction toward the axis of the hub cap to interlock the crown portion with the hub cap whereby the hub cap may be used to mount and secure the shell on a wheel.

GEORGE ALBERT LYON.